April 3, 1956
R. B. McKEE, JR., ET AL
2,740,160
PLASTICATING TORPEDO FOR PLASTICS
DIE EXPRESSING MACHINES
Filed Aug. 20, 1952
2 Sheets-Sheet 1
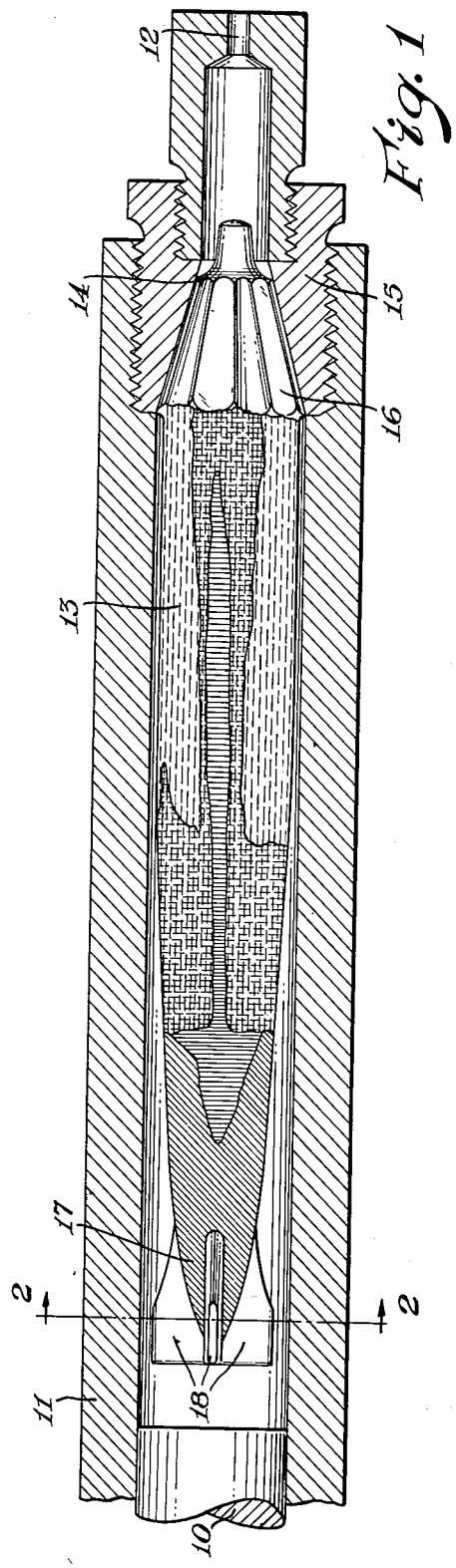
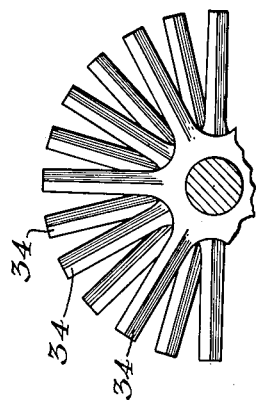
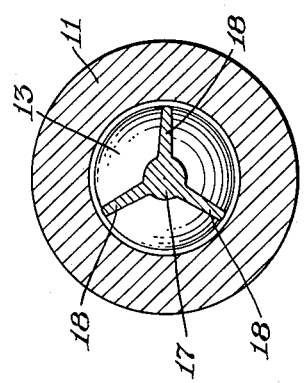
INVENTORS
Robert B. McKee, Jr.
Carlton E. Beyer
BY
Griswold & Burdick
ATTORNEYS April 3, 1956
R. B. McKEE, JR., ET AL
2,740,160
PLASTICATING TORPEDO FOR PLASTICS
DIE EXPRESSING MACHINES
Filed Aug. 20, 1952
2 Sheets-Sheet 2
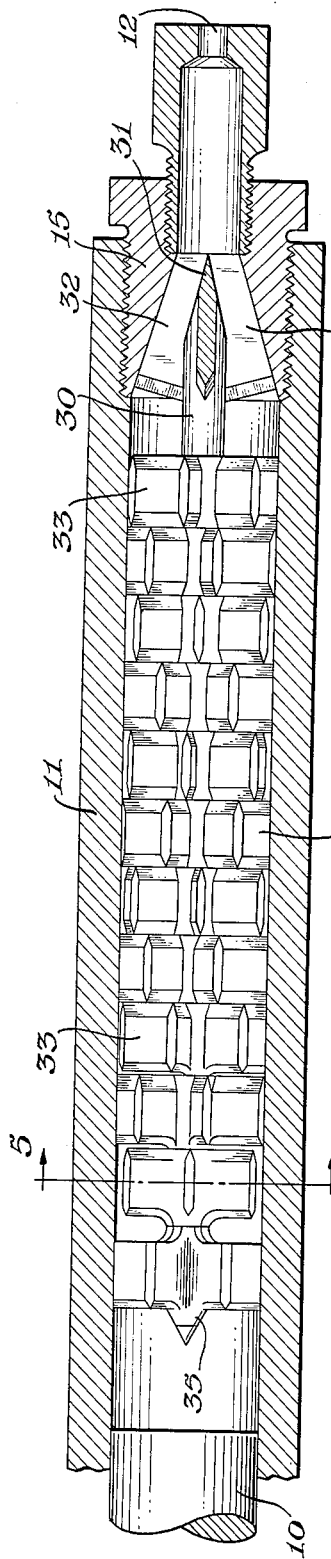
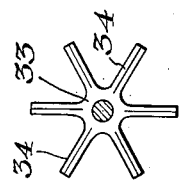
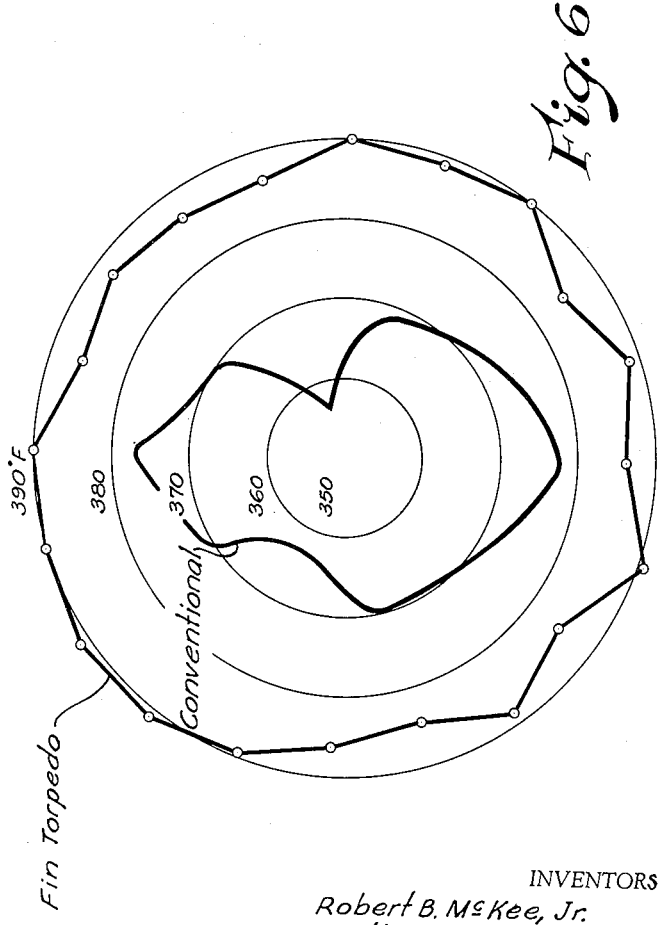
INVENTORS
Robert B. McKee, Jr.
Carlton E. Beyer
BY
Griswold & Burdick
ATTORNEYS

United States Patent Office

2,740,160
Patented Apr. 3, 1956

2,740,160

PLASTICATING TORPEDO FOR PLASTICS DIE EXPRESSING MACHINES

Robert B. McKee, Jr., and Carlton E. Beyer, Midland, Mich., assignors to The Dow Chemical Company, Midland, Mich., a corporation of Delaware Application August 20, 1952, Serial No. 305,366

5 Claims. (Cl. 18—30)

This invention relates to an improved torpedo or spreader for plasticating the stream of organic thermoplastic material being advanced toward a discharge nozzle or orifice in a plastics die expressing machine. It relates in particular to such a device which will increase materially the rate of heat transfer to the advancing plastic and will cause the stream of plastic to approach a condition of thermal uniformity before it is forced through the outlet of the machine.

Almost without exception it is desired that the output of a plastics die expressing machine, whether of the screw-fed or the ram-fed type, be at a uniform temperature, so that the discharged plastic is of uniform viscosity. Many proposals have been made for the internal modification of such machines in attempts to achieve the desired result. Some of the proposed modifications have been so complex as to defy simple and inexpensive cleaning operations. Others have been simple enough to facilitate cleaning when necessary but have been deficient in their attainment of the desired uniformity of the discharged plastic.

It is a common practice to advance the initially granular plastic through a heated cylindrical barrel, either by the action of a feed screw or under the forwarding pressure of a hydraulic ram, and then to effect a diminution of the cross-sectional area of the plastic by causing it to flow through a restricted annular space between the heated barrel and a concentrically disposed fixed spreader or torpedo. Such torpedoes have been said to bring the plastic passing thereover to a uniform condition of temperature and viscosity, but it can be demonstrated readily that they do not do so. The commonest form of fixed torpedo is an elongated cone or cylinder having a smooth surface and a conical tip at the leading or discharge end. The torpedo is centered in the heated barrel by means of a spider or a fluted conical seat at said conical end and by means of at least three radial fins or spacers at the opposite or feed end. In common practice, the spacer fins do not fit snugly in the barrel and, since only one or two of the fins may touch the heated barrel at any given instant, heat transfer to the torpedo and thence to the plastic is quite variable.

It is an object of the present invention to provide an improved torpedo or spreader for plasticating the stream of organic thermoplastic material passing through a die expressing machine (extruder or injection molder) to substantial uniformity both as to temperature and viscosity. A related object is to provide such apparatus which is simple to construct, to insert or remove, and to clean. A particular object is to provide such a torpedo which has such high thermal efficiency that the passing plastic is uniformly fluid so that only a small volume of a new formulation is needed to purge completely any prior material from the machine. Other and related objects may appear hereinafter.

The improved torpedo of the present invention comprises an elongated cylindrical core member within the forward end of the barrel of a plastics die expressing machine; a nose piece secured to the forward end of said core and carrying forwardly tilted radial spacers thereabout, or other means to center the nose piece in the conical adapter at the outlet end of the barrel; a plurality of sets of at least three longitudinally disposed short metal fins of zero pitch symmetrically disposed about the core, each fin of a radial length sufficient to make metallic contact with the barrel, the fins in each set being offset a few degrees from those in several preceding and succeeding sets, thereby providing a number of longitudinal channels equal to the number of fins in each set times the number of different positions occupied by the several sets; and, a conical tail piece on the feed end of the core member to supply smooth lands for distribution of plastic about the core and among the several channels between said fins. The core member may be a solid rod, or it may be a hollow cylinder provided, if desired, with internal heating means. Each fin is provided preferably with a sharp leading edge and a sharp trailing edge, to minimize resistance to flow of plastic thereover. Regardless of the specific contour of the fins, they must not present a flow obstructing surface toward the oncoming plastic. The length of the barrel occupied by one set of fins is preferably from ¾ to 2 times the radius of the barrel. There must be at least three fins in each set to assure centering of the "fin torpedo" of the invention, and it is preferable to have six or more fins in each set. Each fin is of a thickness sufficient to give it the needed rigidity to withstand the forces imposed during extrusion or injection molding operations. The fin sets are made conveniently as single piece cast and polished hub and spoke units, and the hub is drilled so as to slide over the rod-like core member. The fin sets may be secured to the core member by keys, set screws, rivets, or by soldering, brazing or welding.

The new fin torpedo has a snug sliding fit in the barrel of the press, with metal-to-metal contact between the outer end of each fin and the barrel. It is readily withdrawn from the barrel when the latter is opened by removing the head therefrom, but when the torpedo is in place it is incapable of the oscillation shown by other torpedoes under the stress of moving plastic materials.

The torpedo of this invention offers a much lower resistance to the flow of plastic than have the massive cylinders or elongated cones heretofore employed. Since the new torpedo depends largely on the snugly fitting fins for heat transfer to the plastic, it avoids confining the plastic flow to a thin stream between torpedo and barrel, as in the past. The plastic flows almost uninterruptedly past the first set of fins, being heated somewhat thereby, then, with no diminution of cross-section of the plastic mass, the streams are cut successively by the offset fins in other sets, being heated each time along a slightly different line, until, at the exit end of the machine, the whole stream is more uniformly heated than has been possible with prior torpedoes.

The invention may be understood and will be described with reference to the annexed drawings, wherein Fig. 1 is a plan of a standard torpedo of the prior art, showing also the flow of plastic thereover;

Fig. 2 is a section through said torpedo taken along line 2—2 of Fig. 1;

Fig. 3 is a plan of the fin torpedo of the present invention;

Fig. 4 is an end view of a single fin set used in the new torpedo;

Fig. 5 is an end view of the assembled fin torpedo taken along line 5—5 of Fig. 3; and Fig. 6 is a chart showing the temperature of plastic emerging from the nozzle of an injection molding press taken at several points across the face of the nozzle, when using the standard torpedo of Figs. 1–2 and when using the new torpedo of Figs. 3–5, as will be explained in a subsequent example.

Referring first to the conventional arrangement illustrated in Figs. 1 and 2, a die expressing machine for plastics has a ram 10 or other means, such as a feed screw, for advancing the plastic along a heated cylindrical tunnel or barrel 11 toward an injection nozzle 12 or extrusion orifice, as the case may be. In the forward or discharge end of barrel 11 is located an elongated torpedo 13 of circular cross-section. In one common embodiment, torpedo 13 has a conical tip 14 at its forward end, which is seated in a correspondingly conical adapter 15, the latter being an extension of barrel 11 and in open communication with the outlet port of nozzle 12. The conical tip of torpedo 13 has longitudinal grooves 16 between the seated lands, for flow of plastic into the nozzle. In other embodiments, various other centering and seating means are used to hold the tip 14 coaxial with the adapter 15. The rear or feed end 17 of torpedo 13 is roughly centered in barrel 11 by means of three symmetrically disposed radial fins 18, each of which extends a radial distance from the longitudinal axis of the torpedo slightly less than the radius of the barrel 11. One or two of the fins 18 may be in contact with the barrel wall at one time, but it is impossible for all of them to make such contact simultaneously. As granules of the plastic material are advanced along the barrel, they become softened superficially. When the partially softened mass is caused to advance through the constricted annular space between the torpedo and the barrel, the plastic closest to the barrel is softened further, and, as the mass approaches the outlet end of the machine it has been presumed to be uniformly heated. Two tests have demonstrated convincingly that this is not so. In one test, a series of charges of clear plastic was sent through the standard machine, then single shots of each of three colors of the plastic were put through the machine, followed by more clear plastic. The material ejected through the nozzle as a continuous rod was found to have three color streaks, 120° apart, throughout much of its length before any solidly colored rod emerged from the nozzle. After a repeat of this procedure, but before solid color was found in the extruded product, the machine was cooled and the torpedo, with an adhering plastic sheath, was removed. It was noted that a multicolored streak of plastic led forward from each fin, into the mass of clear plastic. Such streaks are reproduced as shading on the cylinder shown in Fig. 1.

In another test of the standard torpedo, a thermocouple was mounted about 0.28 inch from the central axis of a nozzle whose diameter was 1.0 inch. Temperature of the emerging plastic was noted at a fixed point until static conditions were obtained. Thereafter, the nozzle was rotated 18° at a time and the plastic temperature was noted at 20 points on the cross-section of the plastic. While the temperature of the heater around the barrel remained constant at 450° F., the temperature of the plastic varied from a low value of 356° F. to a high of 378° F., or a variation of 22°, and the average temperature of the 20 measured points was 369° F. The temperature gradient so-determined is plotted near the center of the chart of Fig. 6. It is apparent that the tail fins 18 of the standard torpedoes exert a heating and plasticating effect on the charge flowing past them, but that this effect is mainly limited to the path directly ahead of the leading edge of the fins. This was demonstrated further by using a torpedo having six fins extending its entire length. When the heat distribution at the nozzle was measured in plastic material forced over the so-modified torpedo, it was surprising to note that the temperature gradient was 35°, ranging from 355° to 390° F. Such an arrangement was obviously unsatisfactory.

The new fin torpedo of the present invention is illustrated in Figs. 3–5 as comprising a long rod 30 having a conical tip 31, with a plurality of forwardly tilted spacer members 32 serving to seat the torpedo in the conical outlet of adapter 15, and, positioned contiguously along the rod 30, a plurality of multiple fin units 33, each radial fin 34 of which is of a length to fit snugly in metallic contact with barrel 11. Each multiple fin unit 33 is positioned on rod 30 so that its several fins 34 are offset a few degrees from those of any of the several preceding or succeeding units. The end of rod 30 nearest the ram 10 or other plastics forwarding means is fitted with a conical tail-piece 35 which may serve both as a spreading land for the plastic and as a lock for the fin units, though it is preferable to weld these in position on the rod. In the illustrated embodiment, in which each unit 33 has 6 fins 34, the axial rod 30, hubs of units 33 and fins 34 occupy only about 0.25 of the cross-sectional area of barrel 11, whereas the conventional torpedo 13 of Figs. 1 and 2 occupies nearly 0.8 of the cross-sectional area of the barrel 11. Despite this marked difference in the amount of resistance offered by the two structures to the flow of plastic, it will be shown below that the new torpedo is vastly more effective in heating and homogenizing the plastic than is the conventional device. Because of the greater heating capacity and the lower resistance to flow, the new torpedo permits a significantly greater output from the machine.

When an injection molding press was fitted with the new fin torpedo having 12 fin units in series, and with a thermocouple 0.28 inch from the center of its 1-inch diameter nozzle, and the machine was operated with a heater temperature of 450° F. while turning the nozzle to each of 20 positions as before, the plastic temperature at the nozzle varied between 385° and 392° F., or only 7°, and the average temperature at the 20 measured points was 388° F. Hence, there was a 15° narrower range of temperature variations than with the standard torpedo and a 19° higher average temperature across the stream of plastic leaving the machine.

The thoroughness and rapidity with which a machine having the new torpedo can be purged, when changing the composition of the plastic material being worked on, was demonstrated as follows:

An injection molding machine having a nominal delivery capacity of 170 grams (6 ounces) on each full thrust of the ram, had an inventory capacity of 510 grams of polystyrene ahead of the ram when the conventional torpedo of Fig. 1. supplied with the machine, was used, and an inventory capacity of about 900 grams of polystyrene ahead of the ram's furthest point of advance when one of the new fin torpedoes was used having 12 fin units with 6 fins per unit, the fins of each unit being offset at least 20° from those of its neighbors and about 5° from those of any other unit. The machine was charged with clear polystyrene for several shots and, with the nozzle open to the atmosphere, one shot of colored polystyrene was put in the machine, after which only the clear material was used. After the colored charge was introduced to the machine, all plastic emerging from the nozzle was collected and weighed until the effluent had shown the maximum amount of color and had again become clear. The amount of color in the product was recorded as the proportion of the cross-sectional area of the discharged stream which showed any color. The results are given below in tabular form.

| Total weight discharged ahead of measured specimen | Percent of specimen area showing color | |
|---|---|---|
| | Conventional torpedo | New fin torpedo |
| 350 | first trace | 0 |
| 400 | 7 | 0 |
| 500 | 25 | 0 |
| 540 | 35 | first trace |
| 580 | 46 | 6 |
| 640 | | 14 |
| 670 | 67 | |
| 720 | 58 | 30 |
| 750 | 45 | 64 |
| 790 | 30 | 81 |
| 850 | 22 | 90 |
| 890 | | 86 |
| 900 | 15 | |
| 950 | 9 | 43 |
| 1,000 | 5 | |
| 1,030 | | 25 |
| 1,060 | 1 | |
| 1,090 | | 20 |
| 1,170 | | 13 |
| 1,400 | | 10 |
| 1,570 | | 1 |

When the plastics inventory is considered in each case, it is noted that initial color appeared with the conventional torpedo after about 350 grams (about 0.7 times the inventory) had been added following the single colored charge, maximum color distribution occurred after 670 grams (1.3 times the inventory), and that at least 1060 grams (about 2.1 times the inventory) was needed to eliminate color from the product. The maximum distribution of color only covered about 67 per cent of the cross-sectional area of the product. In contrast thereto, with the new fin torpedo, color began to appear in the product after addition of 540 grams (0.6 times the inventory), maximum color distribution occurred after addition of 900 grams (equal to the inventory), and about 1600 grams (less than 1.8 times the inventory) was needed to eliminate color from the product. The maximum area covered by the single colored charge was 90 per cent, when using the new fin torpedo. These data show that the new torpedo causes much more uniform flow of the plastic in the heating chamber than does the conventional torpedo. This is made possible both by the fact that the torpedo is heated nearly to the same temperature as the barrel by conduction through the several fins all of which touch the barrel, and by the staggered positions of the several fin units which help to expose substantially all of the plastic to a heated metal surface. These are believed to be important considerations, owing to the inherently poor rate of heat transfer through most organic thermoplastic masses. The fin torpedo of the preceding example had 72 total fins, in as many radial positions, thus forming 72 heated lines of flow radiating about the core, supplementing the circumferential heating from the barrel.

The performance of an injection molding machine as measured in pounds of plastic material put through the machine per hour, is known to vary proportionately to the temperature difference between the heated barrel and the discharged plastic. More specifically, the output per hour varies inversely with the value of E in the equation:

$$E = \frac{T_A - T_0}{T_i - T_0}$$

wherein $T_A$ is the temperature of the plastic at the nozzle, $T_i$ is the temperature of the heater around the barrel, and $T_0$ is room temperature.

The closer $T_A$ approaches $T_i$, the larger is the value of E, and the lower is the output of the machine. Two models of a standard injection molding machine having the conventional torpedo of Fig. 1, and rated as "6-ounce" and "16-ounce" machines, have the normal output tabulated below, when they are used with polystyrene. When one of the "6-ounce" machines is modified by substituting the fin torpedo of the present invention (using 12 fin units, 6 fins each) for the standard torpedo, the output is increased about 80 per cent and is as great as that of the "16-ounce" model with the standard torpedo.

| E | Output, pounds polystyrene per hour | | |
|---|---|---|---|
| | 6-oz. standard | 16-oz. standard | 6-oz. with fin torpedo |
| 0.90 | 17 | 28 | 28. |
| 0.85 | 24 | 42 | 42. |
| 0.80 | 32 | 56 | 56. |
| 0.75 | 42 | 72 | not measured. |

We claim:

1. In a plastics die expressing machine having a cylindrical heated barrel, a plastics forwarding means operable in said barrel, and an outlet for fluid plastic at the end of the barrel, the improvement which consists in: a torpedo coaxial with the barrel, located between the said forwarding means and said outlet, said torpedo comprising an axial core of small diameter relative to that of the barrel and having a plurality of sets of at least three symmetrically disposed rigid metallic radial fins of zero pitch extending outwardly from said core, the outer end of each fin being in metallic contact with the barrel, the upstream edge of each fin being free from flow obstructing surfaces, and the fins in each set being offset from those in any of several preceding and succeeding sets along the core; a conical land on the upstream end of the core; and means near the outlet for seating the core coaxially with the end of the barrel.

2. The improved machine claimed in claim 1, wherein each set of fins along the core of the torpedo is immediately adjacent the next such set.

3. The improved machine claimed in claim 1, wherein each fin is provided with sharp leading and trailing edges.

4. The improved machine claimed in claim 1, wherein there are six fins in each set, spaced 60 degrees apart about the core.

5. The improved machine claimed in claim 1, wherein the length of the barrel occupied by each set of fins is from ¾ to 2 times the radius of the barrel.

References Cited in the file of this patent

UNITED STATES PATENTS

| 2,358,354 | Stacy et al. | Sept. 19, 1944 |
| 2,480,838 | Caron | Sept. 6, 1949 |
| 2,482,243 | Burnham | Sept. 20, 1949 |
| 2,500,401 | Cossette | Mar. 14, 1950 |
| 2,565,522 | Renier | Aug. 28, 1951 |
| 2,669,750 | Keeney | Feb. 23, 1954 |